US009464671B2

(12) United States Patent
Hebrard

(10) Patent No.: US 9,464,671 B2
(45) Date of Patent: Oct. 11, 2016

(54) BEARING, HOUSING INCLUDING A SET OF BEARINGS, ASSOCIATED METHOD AND COMPUTER PROGRAM

(71) Applicant: Aktiebolaget SKF, Göteborg (SE)

(72) Inventor: Yoann Hebrard, Sarras (FR)

(73) Assignee: SKF AEROSPACE FRANCE S.A.S., Saint-Vallier (FR)

( * ) Notice: Subject to any disclaimer, the term of this patent is extended or adjusted under 35 U.S.C. 154(b) by 392 days.

(21) Appl. No.: 14/078,320

(22) Filed: Nov. 12, 2013

(65) Prior Publication Data

US 2014/0169715 A1 Jun. 19, 2014

(30) Foreign Application Priority Data

Nov. 12, 2012 (FR) ..................................... 12 60743

(51) Int. Cl.
*G01M 13/04* (2006.01)
*G01H 1/00* (2006.01)
*F16C 41/00* (2006.01)

(52) U.S. Cl.
CPC ............... *F16C 41/00* (2013.01); *G01H 1/003* (2013.01); *G01M 13/045* (2013.01)

(58) Field of Classification Search
CPC ..... F16C 41/00; G01M 13/045; G01H 1/003
USPC ............................................ 73/579; 384/448
See application file for complete search history.

(56) References Cited

U.S. PATENT DOCUMENTS 6,595,693 B1 * 7/2003 Message .............. F16C 41/007 324/174
2002/0139191 A1 10/2002 Hedeen et al.
2005/0119840 A1 6/2005 Astley et al.
2007/0262875 A1 * 11/2007 El-Ibiary .............. G06K 19/041 340/572.8
2008/0234964 A1 9/2008 Miyasaka et al.
2010/0089162 A1 * 4/2010 Akamatsu ........... G01M 13/045 73/593
2013/0116936 A1 * 5/2013 Yamamoto ............. F16C 19/52 702/34

FOREIGN PATENT DOCUMENTS

CN 102709668 * 10/2012
DE 102008021360 A1 11/2009
DE 102010024850 A1 * 12/2011 ............ F16C 41/007
EP 1548419 A1 6/2005
FR 2918172 A1 1/2009
WO WO2013063922 * 5/2013 ........... H04B 1/1081

* cited by examiner

*Primary Examiner* — J M Saint Surin
(74) *Attorney, Agent, or Firm* — Bryan Peckjian; SKF USA Inc. Patent Dept.

(57) ABSTRACT

The invention relates to a bearing (10) including an inner ring (12), an outer ring (11), and rolling bodies positioned between the inner and outer rings, one of the rings being rotary and the other not, the bearing further including:

- a first module (20) including at least one set of sensor(s) suitable for performing successive measurements of at least one parameter representative of the vibrations within the bearing; and
- a second module (20) suitable for determining a frequency representation of the signal corresponding to the successive measurements, and for obtaining a set of elements(s) representative of the frequency representation based on that frequency representation, so as to compare at least one representative element of the set with a corresponding reference element and identify a malfunction based on that comparison (10).

19 Claims, 2 Drawing Sheets

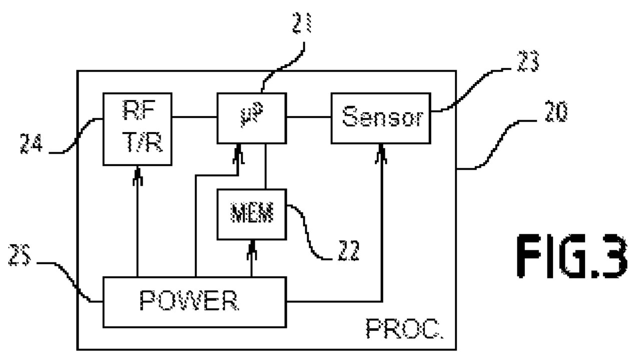
FIG.3
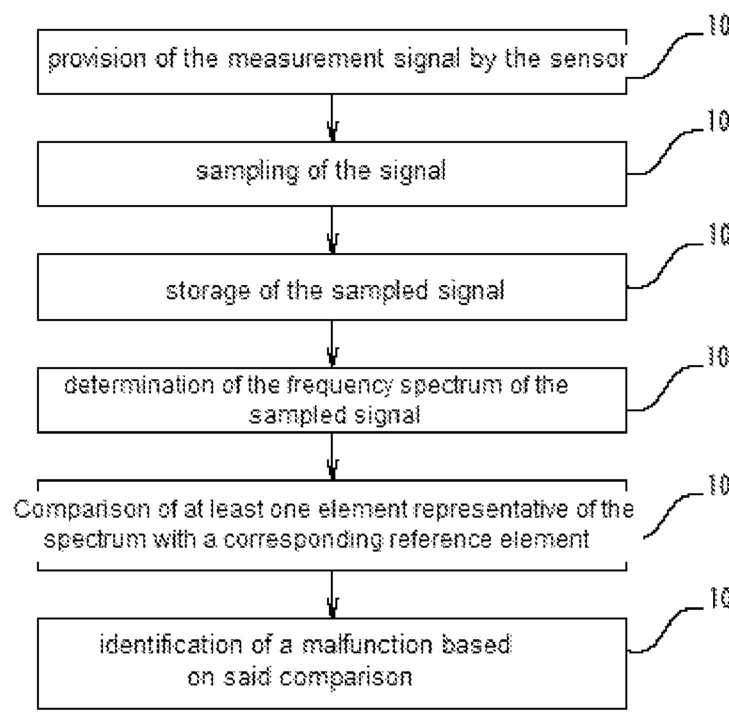
FIG.4
t
A B C D E
FIG.5

BEARING, HOUSING INCLUDING A SET OF BEARINGS, ASSOCIATED METHOD AND COMPUTER PROGRAM

CROSS-REFERENCE TO RELATED APPLICATIONS

This application claims priority to French Patent Application No. 1260743, filed Nov. 12, 2013, which is hereby fully incorporated by reference.

FIELD OF THE INVENTION

The present invention relates to a bearing including an inner ring and an outer ring and rolling bodies positioned between the rings, one of the rings being rotary and the other not.

BACKGROUND OF THE INVENTION

Such bearings are for example used in various equipments, in particular transmissions, for example helicopter transmissions, as described in document EP0172104.

In such a transmission, it is necessary to monitor the state and operating conditions of the component elements thereof, in particular elements for which the bearing is the support. The known monitoring elements for such a transmission generally use an array of sensors outside the transmission, and the reliability is not very satisfactory.

The present invention aims in particular to improve the monitoring of such equipment.

SUMMARY OF THE INVENTION

To that end, according to a first aspect, the invention proposes a bearing of the aforementioned type, characterized in that it further includes:

a first module including at least one set of sensor(s) suitable for performing successive measurements of at least one parameter representative of the vibrations within the bearing; and a second module suitable for determining a frequency representation of the signal corresponding to the successive measurements, and for obtaining a set of elements(s) representative of the frequency representation as a function of that frequency representation, so as to compare at least one representative element of the set with a corresponding reference element and identify a malfunction as a function of that comparison.

Such a bearing makes it possible to provide information on the local and actual operating conditions of the bearings.

In embodiments, the bearing according to the invention further includes one or more of the following features:

a set of sensor(s) is suitable for performing successive measurements of at least one parameter representative of low-frequency, medium-frequency, high-frequency and/or ultrasonic frequency vibrations, within the bearing;

the first module is secured to one of the rings;

the second module is suitable for comparing the at least one element representative of the frequency representation with a corresponding reference element;

the set of representative element(s) includes at least one frequency corresponding to a peak of the frequency representation, and/or the amplitude of the peak, and/or the spectral energy in a predetermined bandwidth of the frequency representation;

the time separating two successive time samples considered for the frequency transform used to determine the frequency representation depends on the relative speed of rotation between the two inner and outer rings;

the second module is secured to one of the rings;

the bearing includes radiofrequency communication module suitable for emitting data depending on at least the representative element;

the bearing further includes power supply means for at least the first module;

the set of sensor(s) is further suitable for measuring the temperature and/or a relative angular movement between the inner and outer rings;

the first module is a system on chip.

According to a second aspect, the present invention proposes a housing including a set of bearing(s) according to the first aspect of the invention, further including a radiofrequency receiving module and a multiplex transmission module, the housing being suitable for receiving, by means of the radiofrequency receiving module, the data emitted by each bearing of the bearing assembly, processing the data and sending the process data to a recipient outside the housing, using the multiplex transmission module.

According to a third aspect, the present invention proposes a method for determining a malfunction in a bearing including at least an inner ring, an outer ring, and rolling bodies positioned between the inner and outer rings, one of the rings being rotary and the other being not rotary, the method comprising the following steps:

performing successive measurements of a parameter representative of the vibrations within the bearing;

determining a frequency representation of the signal corresponding to the successive measurements, and obtaining a set of elements(s) representative of the frequency representation as a function of the frequency representation;

comparing at least one element representative of the assembly with a corresponding reference element so as to identify a malfunction as a function of the comparison.

According to a fourth aspect, the present invention proposes a computer program intended for a module for determining a malfunction in a bearing including at least an inner ring, an outer ring, and rolling bodies positioned between the inner and outer rings, one of the rings being rotary and the other being not rotary, the computer program being characterized in that it includes software instructions which, when run on a computer of the module for determining a malfunction in a bearing, carry out the steps of a method according to the third aspect of the invention.

BRIEF DESCRIPTION OF THE FIGURES

These features and advantages of the invention will appear upon reading the following description, provided solely as an example, and done in reference to the appended drawings, in which:

FIG. 3 is a summary view of a processing module of the bearing in one embodiment of the invention;

FIG. 4 is a flowchart of steps carried out by the processing module of FIG. 3 in one embodiment of the invention;

FIG. 5 illustrates the detectability of defects as a function of the methods and time.

DETAILED DESCRIPTION OF THE INVENTION

Figure 1:
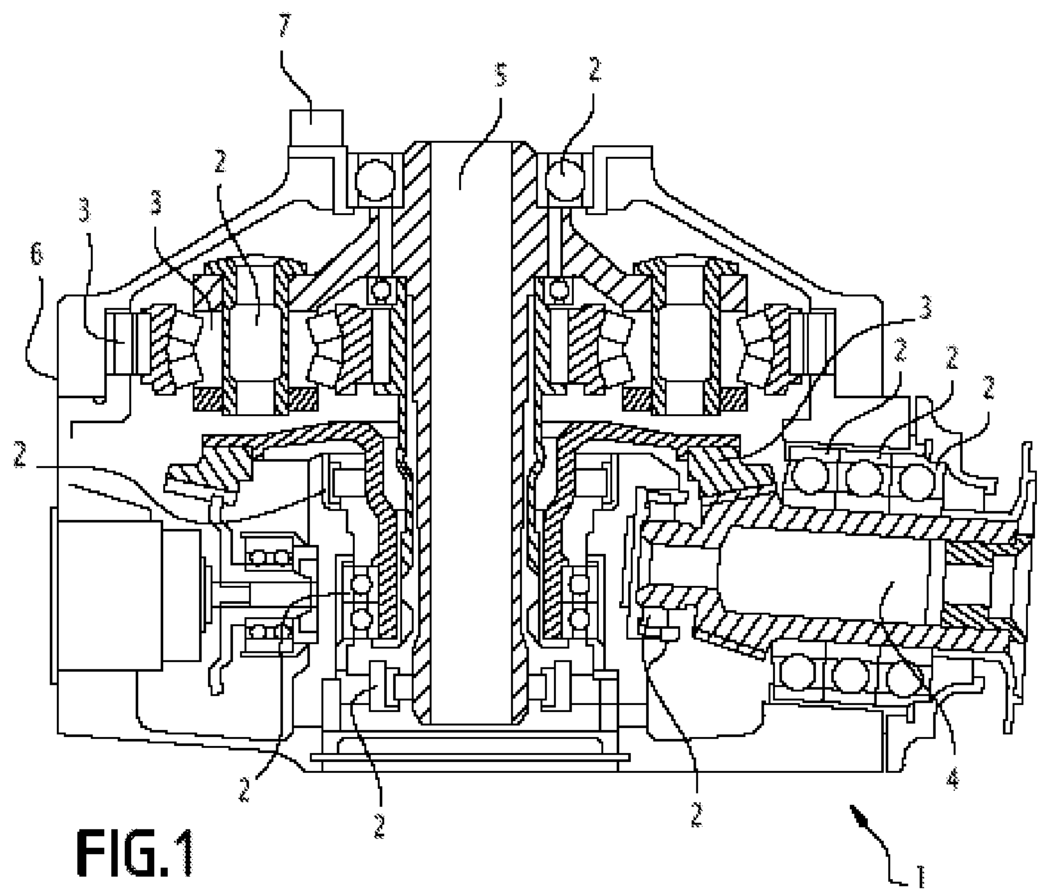
FIG. 1 shows a cross-sectional view of a helicopter transmission.

FIG. 1 shows a cross-sectional view of a helicopter transmission 1. This transmission 1 is suitable for transmitting rotational movement between the primary shaft 4, which is the shaft of the engine, and a secondary shaft 5, which is the rotor of the helicopter, according to several transmission ratios. It comprises an outer housing 6 which includes, aside from the primary and secondary shafts, several bearings 2 and several gears 3.

In one embodiment of the invention, each of these bearings 2 is similar to the mechanical bearing 10 described below in reference to FIGS. 2 and 3.

Figure 2:
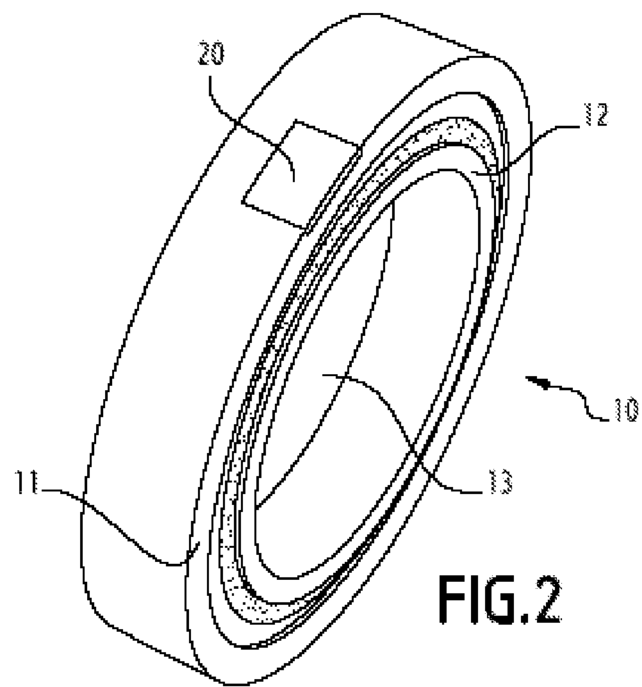
FIG. 2 is a view of a bearing in one embodiment of the invention.

In reference to FIG. 2, a mechanical bearing 10 in one embodiment of the invention includes two coaxial rings: an outer ring 11 and an inner ring 12.

Between these coaxial rings 11 and 12, rolling elements, for example beads, are placed in a lubricant and kept separated by a cage (not shown).

In a known manner, a bearing 10 optimizes the friction between two parts and procures support for one of the two parts, which is rotating.

One of these parts (not shown) is secured to the inner ring 12. This is for example a rotating shaft positioned in the housing 13 circumscribed by the inner ring 12. The inner ring 12 is for example mounted tightened on the rotating shaft. In the case of the transmission 1, this shaft is for example the primary shaft 4.

The other part is fastened to the outer ring 13. For example, the other part is a part of the housing outside the transmission 1, and is stationary relative to the rotating shaft.

It will be noted that in other bearings 10 according to the invention, it is the outer ring that is tightly fixed to a rotating part, while the inner ring is secured to the stationary part.

According to the invention, a processing module 20 is fixed on one of the rings. For example, the processing module 20 is integrated into a fixed housing on a ring of the bearing, by screwing or crimping. In another example, a form is created in a ring of the bearing that form serving as a support for the processing module 20.

As shown in FIG. 2, in the considered case, the processing module 20 is fixed on the outer surface of the outer ring 11.

The processing module 20 includes a microprocessor 21, a memory 22, a sensor 23 suitable for measuring one or more parameters, a radiofrequency transmitter 24, and a power supply module 25.

The power supply module 25 is suitable for supplying electricity to the components of the processing module 20, the operation of which requires such electricity. Thus, it provides electricity in particular to the microprocessor 21, the radiofrequency transceiver 24, and optionally the sensor 23.

In one embodiment, the sensor 23 is a sensor suitable for measuring at least one parameter representative of vibrations along one axis (for example, the radial axis relative to the rings of the bearing), or along two axes or three axes. Such a sensor for example comprises one or more accelerometers.

In one embodiment, the sensor 23 suitable for measuring at least one parameter representative of the vibrations occurring in the entire frequency range, i.e., a low frequency (below 10 Hz), medium frequency (10-1,000 Hz), high frequency (above 1,000 Hz), and ultrasonic frequency (20-2,000 kHz).

In another embodiment, the sensor 23 is suitable for measuring at least one parameter representative of the vibrations occurring in part of that frequency range.

In one embodiment, the sensor 23 is suitable for delivering a signal, for example analog, to the microprocessor 21, indicating the successive measurements of the parameter taken by the sensor 23.

After the microprocessor 21 executes software instructions from a program stored in the memory 22, the following steps are carried out, in reference to FIG. 4:

In a step 100, the signal indicating successive measurements by the sensor 23 is delivered to the microprocessor 21.

In a step 101, the signal provided by the sensor is sampled and converted into numerical data representing successive values of the measured parameter.

In a step 102, this numerical data is stored in the memory 22.

In a step 103, from this successive numerical temporal data over a time range with length T0, a frequency representation of the signal is determined, for example using a Fourier transform (or a Laplace transform, or a Z-tranform, etc.).

The spectrum thus determined includes peaks, each peak (or local maximum) corresponding to a frequency specific to each of the different parts of the bearing, such as the inner ring, the outer ring, the rolling elements, the cage, the lubricant.

Each part such as rings, rolling elements, cage, etc., included by the bearing emits a vibration that can be connected to the frequency of rotation of the bearing. This vibration specific to the considered part of the bearing evolves with the wear of the considered part of the bearing and the wear of the bearing or damage to the functional surfaces of the contact ensuring proper operation of the bearing. The acquisition of play following wear or damage of the functional surfaces modifies the frequency position of that specific vibration in the vibrational spectrum, the amplitude or the phase relative to the speed of rotation.

The lubricant also affects the vibrational spectrum of the bearing, since its purity, for example, may influence the form of the vibrational spectrum.

This spectrum constitutes the signature of the bearing in its state corresponding to the considered time range.

In a step 104, one or more elements representative of the spectrum are compared relative to one or more corresponding so-called reference elements. These reference elements are determined based on a spectrum or one or more previously determined spectrums, called reference spectrums, or are calculated using theoretical formulas.

These elements representative of the spectrum for example include a specific frequency of part of the bearing or the specific frequencies of several such parts, and/or the amplitude of one or more of the specific frequencies, and/or the energy of the spectrum in a predetermined frequency band.

These representative frequencies depend on the geometric characteristics of the bearing, as well as its type (ball bearing, roller bearing, etc.).

The theoretical calculation formulas are well known by those skilled in the art and will be recalled below. The frequency is a harmonic of the speed of rotation.

In one embodiment, these representative elements of the spectrum are compared to corresponding elements representative of a reference spectrum, for example determined from the new bearing.

The reference spectrum may also be a spectrum obtained in a time range earlier than the currently considered range.

In one embodiment, the reference elements are for example obtained based on average spectrums or as a function of spectrums previously measured, for example on a new bearing, serving as a reference state or coming from a model of the progression of damage to the functional surfaces.

In a step 105, the presence or absence of a malfunction relative to the bearing is determined as a function of this comparison and, for example, minimum predetermined thresholds of the offset between the compared elements.

For example, let us consider the case of a bearing whereof the rings rotate at two different speeds of rotation.

The theoretical frequency is calculated for one part or each of several parts (rings, rolling elements, cage, lubricant, etc.) of the bearing.

This calculation makes it possible to define the theoretical frequency of each considered part of the bearing, and therefore its position in the spectrum.

One of these frequencies is for example obtained using the following formula:

$$F_{theo}=(D/(2d)(N_2-N_1)(1-(d/D)^2)$$

with D the nominal diameter of the considered part (ring, cage), d the diameter of a rolling element, N1 and N2 the relative speeds of rotation of the rings, and cos $\alpha$ is taken to be equal to 1, $\alpha$ being the contact angle of the rolling elements on the rolling path.

The vibrational signal emitted by the bearing is acquired. Filtering may be applied.

The current spectrum of the bearing is obtained.

The latter, including a frequency component on the X axis and an amplitude component on the Y axis, is divided into several spectral bands (for example, the successive bands B1, B2, B3 and B4), each band being a zone in which a frequency subject to the monitoring is located.

If the speeds of rotation of the bearing are not fixed, the sampling of the signal, i.e., the acquisition of the corresponding frequency transform, may be done by synchronizing the acquisition of the signal to the speed of rotation of the inner ring relative to the outer ring. This method requires a precise measurement of the variations of the relative speed of rotation.

This processing makes it possible to eliminate the non-stationarity of the signal, which may move the specific frequencies sought, the specific frequencies of the parts of the bearing being harmonics of the speed of rotation.

In each band B1 to B4, the following processing is for example applied:

- i/Identification of the theoretical specific frequencies and associated harmonics (multiples of the specific frequency) in each band. The amplitude of the vibrational spectrum of each of these frequencies is compared to its amplitude for a new bearing.
- ii/In each spectral band (B1, B2, B3, B4), calculating an indicator relative to the form of the signal (kurtosis, average of the amplitudes, peak-to-peak ratio). The level of this indicator is compared to that of the new bearing so as to determine its level of damage.

The monitored amplitude may be that of an acceleration, a speed or a movement. This choice depends primarily on the desired sensitivity for the measurement and the speed of rotation.

For example, in one embodiment, the specific frequency of at least one part of the bearing is detected and a frequency shift of that specific frequency is thus identified in the obtained spectrum by comparison to the specific frequency of that same part in a reference spectrum or by comparison to the theoretical specific frequency of that same part given by the formulas. The presence of peeling on that part is determined based on a comparison. A maintenance operation may therefore be planned before the damage to the bearing becomes excessive or causes a breakdown on the transmission.

In one embodiment, the frequency peak specific to a part is detected following the search, in the obtained current spectrum, for the frequency peak closest to the frequency peak of the part in the reference spectrum (or the theoretical frequency), that peak being such that the difference between the amplitudes of the peak must further comply with certain conditions, for example have a standard below a given threshold.

Then, information resulting from this processing is provided to the radiofrequency transmitter 24, which is suitable for transmitting it to a monitoring module 7 by radiofrequency channel. The transmission modalities are for example as follows: transmission every period with a fixed duration T, transmission each time data with a fixed volume V is available, and/or transmission when the value of a coefficient resulting from the comparison of step 105 reaches a fixed alert threshold, the coefficient being calculated by the processing module as a function of the value of the measurement data most recently stored. The alert threshold, the volume and/or the fixed duration T is stored in memory 22, for example.

In one embodiment, the set of sensors 23 for example includes a sensor suitable for measuring the temperature and/or the angular position of one ring relative to the other ring, etc.

When the set of sensors includes different types of sensors, for example a vibration sensor, temperature sensor, the measurements provided allow extensive coverage of the evolutions of defects within the bearing.

FIG. 5 illustrates the detectability of defects as a function of the methods and time. The moments A to E follow one another in that order over time. Let us consider that at moment A, the beginning of peeling has occurred.

This defect may be detected as of moment B by ultrasound analysis (detection that ultrasound amplitude thresholds have been exceeded).

As of moment C, this defect may be detected by multispectral analysis according to the invention as indicated in reference to steps 100-105.

As of moment D, this defect may be detected by vibrational analysis (detection that vibration amplitude thresholds have been exceeded).

This beginning of peeling in a bearing will cause, in a final stage as of moment E, a temperature increase, the debris thus released deteriorating the lubricant. The temperature increase may be detected by monitoring the temperatures.

The ultrasound analysis consists of measuring the amplitudes of the time signal only.

In one embodiment, the components of the processing module 20 are integrated on microelectronics of the ASIC type.

In one embodiment, the radiofrequency transmitter 24 is replaced by a radiofrequency transceiver 24, capable of receiving information by radiofrequency channel. This information, processed by the microprocessor 21, is for example used to modify the processing of the measurements done by the processing module (no sampling, frequency of data transmissions, averaging parameters, etc.) and/or to modify the fixed alert threshold, volume and/or duration T that is stored in memory 22, for example.

It will be noted that in another embodiment, the processing module 20 is fixed on the inner face of the outer ring 11, i.e., on the face of the outer ring across from the inner ring 12. In another embodiment, the module 20 is fixed on the inner face of the inner ring 12, i.e., on the face of the outer ring across from the element around which the inner ring 12 is fixed. In another embodiment, the module 20 is fixed on the outer face of the inner ring 12, i.e., on the face of the inner ring across from the outer ring 11.

In one embodiment of the invention, the transmission 1 further includes the monitoring module 7 fixed on the outside of the housing 6.

The monitoring module 7 comprises a radiofrequency receiver capable of receiving the radiofrequency data emitted by each of the bearings 2 similar to the bearing 10 described above.

The monitoring module 7 further comprises a memory and is suitable for storing the radiofrequency data matched with an identifier of the bearing from which it was emitted, and optionally matched with dating data for example representative of the time of receipt of the data by the monitoring module.

In one embodiment, the monitoring module 7 is suitable for performing processing operations on that data. For example, the monitoring module 7 performs averaging operations for data emitted by a bearing. For example, the monitoring module 7 is suitable for combining data emitted by separate bearings, so as to identify or characterize malfunctions as a function of that combined data.

The system for example averages the amplitudes of the signal relative to a frequency division defined from specific frequencies of the parts of the bearing. The temperature is also averaged and recorded. As previously illustrated, it serves as a final alert threshold in the event the other indicators have not detected a defect.

In one embodiment, the monitoring module 7 includes transmission means, for example wired, suitable for transmitting the processed data to centralization equipment.

In one embodiment, only part of the processing operations 100 to 105 are performed in the processing module 20 secured to the ring. In such a case, the processing module 20 then uses the radiofrequency transmitter 24 to send the digital data resulting from step 100, 101, 102, 103 or 104 to another processing module, which in turn performs all or some of the subsequent steps. This other processing module is, depending on the embodiments, remote from the bearing; for example, it is integrated into the monitoring module 7. In one embodiment, it may be integrated into the bearing, but located somewhere other than the processing module 20.

The invention thus makes it possible to monitor the elements of the transmission and their operating conditions, and to identify signs of malfunction. It is thus possible to detect, as early as possible and more precisely than in the systems of the prior art, the occurrence of cracks on gear teeth and deteriorations of bearings, and to take the necessary corrective actions.

It also makes it possible to detect, as early as possible and more precisely than the systems of the prior art, for example, excessive temperature variations, etc., and to take the necessary corrective actions.

In one embodiment, the power supply module 25 includes a fuel cell, a battery integrated into the system on chip, and/or is suitable for receiving electricity resulting from the conversion of the mechanical energy generated by the ball bearing, as described below.

Several theoretical formulas for determining specific frequencies are provided below, where it is considered that only one ring rotates.

The passage frequency of a rolling element of the inner ring (BPFI, Ball Pass Frequency of the Inner Ring, which is the frequency at which the rolling elements 14 pass in the rolling path of the inner ring), is:

$$BPFI = \frac{z}{2}\left(1 + \frac{D_w}{d_m}\cos\alpha\right),$$

where z is the number of rolling elements in each row of rolling elements;

$D_w$ is the diameter of a rolling element 14;

$d_m$ is the diameter of the circle traveled by a rolling element;

α is the contact angle of the rolling elements on the path.

The shifts of this BPFI frequency are representative of damage affecting the rolling path of the inner ring.

The theoretical formula of the passage frequency of a rolling element of the outer ring (BPFO, Ball Pass Frequency of the Outer Ring, which is the frequency at which the rolling elements 14 pass in the rolling path of the outer ring), is:

$$BPFO = \frac{z}{2}\left(1 - \frac{D_w}{d_m}\cos\alpha\right).$$

The shifts of this BPFO frequency are representative of damage affecting the rolling path of the outer ring (fragments or slits, for example).

The theoretical formula for the frequency of rotation of the rolling elements rolling around themselves (BSF, Ball Spin Frequency, which is the frequency at which the rolling elements 14 rotate around themselves in the bearing), is:

$$BSF = \frac{d_m}{2D_w}\left(1 - \left(\frac{D_w}{d_m}\cos\alpha\right)^2\right).$$

The shifts of this BSF frequency are representative of damage affecting a rolling element.

The theoretical formula of the Fundamental Train Frequency (FTF, which is the frequency at which the cage, containing the rolling elements 14, rotates), is $$FTF = \frac{1}{2}\left(1 - \frac{D_w}{d_m}\cos\alpha\right).$$

The shifts of this FTF frequency are representative of damage affecting the cage.

The invention claimed is:

1. A bearing comprising:

an inner ring;

an outer ring;

rolling bodies positioned between the inner and outer rings, one of the inner and outer rings being rotary and a remaining other of the inner and outer rings being fixed;

a first module comprising at least one sensor configured to perform successive measurements of at least one parameter representative of vibrations within the bearing; and a second module configured to:

determine a frequency representation of signal corresponding to the successive measurements, obtain a set of elements representative of the frequency representation as a function of that frequency representation, and compare at least one representative element of the set of elements with a corresponding reference element to identify a malfunction as a function of the comparison.

2. The bearing according to claim 1, further comprising at least one second sensor configured to perform at least one parameter representative of low-frequency, medium-frequency, high-frequency or ultrasonic frequency vibrations, within the bearing.

3. The bearing according to claim 2, wherein the first module is secured to one of the inner and outer rings.

4. The bearing according to claim 3, wherein the at least one element includes at least one frequency corresponding to a peak of the frequency representation, an amplitude of the peak, or a spectral energy in a predetermined bandwidth of the frequency representation.

5. The bearing according to claim 4, wherein a time separating two successive time samples considered for a frequency transform used to determine the frequency representation depends on a relative speed of rotation between the inner and outer rings.

6. The bearing according to claim 5, wherein the second module is secured to one of the inner and outer rings.

7. The bearing according to claim 6, further comprising a radiofrequency communication module configured to emit data depending on at least the representative element.

8. The bearing according to claim 7, further comprising a power supply means for at least the first module.

9. The bearing according to claim 8, wherein the at least one sensor is configured to measure a temperature or a relative angular movement between the inner and outer rings.

10. The bearing according to claim 9, wherein the first module is a system on a chip.

11. A housing comprising:

a set of bearings having;

an inner ring rings;

an outer ring rings;

rolling bodies positioned between the inner and outer rings, one of the inner and outer rings being rotary and a remaining other of the inner and outer rings being fixed;

a first module comprising at least one sensor configured to perform successive measurements of at least one parameter representative of vibrations within the bearing;

a second module configured to:

determine a frequency representation of a signal corresponding to the successive measurements obtain a set of elements representative of the frequency representation as a function of that frequency representation, and compare at least one representative element of the set of elements with a corresponding reference element to identify a malfunction as a function of the comparison;

a radiofrequency receiving module; and a multiplex transmission module, wherein the housing is configured to receive, by means of the radiofrequency receiving module, data emitted by each bearing of the set of bearings, to process the data to produce processed data, and send the process data to a recipient outside the housing via the multiplex transmission module.

12. A method for determining a malfunction in a bearing including at least an inner ring, an outer ring, and rolling bodies positioned between the inner and outer rings, one of the inner and outer rings being rotary and a remaining other of the inner and outer rings being fixed, the method comprising:

performing successive measurements of a parameter representative of vibrations within the bearing;

determining a frequency representation of a signal corresponding to the successive measurements;

obtaining a set of elements representative of the frequency representation as a function of the frequency representation; and comparing at least one representative element of the set of elements with a corresponding reference element to identify a malfunction as a function of the comparison of the at least one element.

13. The method according to claim 12, wherein the parameter is representative of low-frequency, medium-frequency, high-frequency or ultrasonic frequency vibrations within the bearing.

14. The method according to claim 13, wherein the bearing includes a first module secured to one of the inner and outer rings, and the first module including at least one sensor configured to perform the successive measurements.

15. The method according to claim 14, wherein the bearing includes a second module configured to determine the frequency representation of the signal and to obtain the set of elements representative of the frequency representation as a function of the frequency representation.

16. The method according to claim 15, wherein the second module is configured to perform the comparing of the at least one element representative.

17. The method according to claim 16, wherein the at least one element includes at least one frequency corresponding to a peak of the frequency representation, an amplitude of the peak, a spectral energy in a predetermined bandwidth of the frequency representation.

18. The method according to claim 17, wherein a time separating two successive considered time samples for a frequency transform used to determine the frequency representation is a function of a relative speed of rotation between the inner and outer rings.

19. A computer program product stored within a non-transitory computer readable medium of a module, the computer program product comprising processor executable instructions for determining a malfunction in a bearing, the bearing including at least an inner ring, an outer ring, and rolling bodies positioned between the inner and outer rings, one of the rings being rotary and the other being fixed, the processor executable instructions executable by a processor of the module to cause the processor to perform:

successively measuring a parameter representative of the vibrations within the bearing;

determining a frequency representation of the signal corresponding to the successively measuring of the parameter;

obtaining a set of elements representative of the frequency representation as a function of the frequency representation;

comparing at least one element representative of the assembly with a corresponding reference element to identify a malfunction as a function of the comparing of the at least one element representative.

* * * * *